US008758865B2

(12) United States Patent
Belelie et al.

(10) Patent No.: US 8,758,865 B2
(45) Date of Patent: *Jun. 24, 2014

(54) ULTRA-VIOLET CURABLE GELLANT INKS FOR TACTILE AND REGULAR PRINT APPLICATIONS FOR SIGNATURE AND DOCUMENT AUTHENTICATION

(75) Inventors: Jennifer L. Belelie, Oakville (CA); Michelle N. Chretien, Mississauga (CA); Naveen Chopra, Oakville (CA); Barkev Keoshkerian, Thornhill (CA)

(73) Assignee: Xerox Corporation, Norwalk, CT (US)

( * ) Notice: Subject to any disclaimer, the term of this patent is extended or adjusted under 35 U.S.C. 154(b) by 1317 days.

This patent is subject to a terminal disclaimer.

(21) Appl. No.: 12/204,323

(22) Filed: Sep. 4, 2008

(65) Prior Publication Data

US 2010/0055415 A1   Mar. 4, 2010

(51) Int. Cl.
*C08F 2/48* (2006.01)

(52) U.S. Cl.
USPC ........... 427/511; 427/508; 427/514; 427/517; 427/519

(58) Field of Classification Search
USPC .................. 427/508, 511, 514, 517, 519
See application file for complete search history.

(56) References Cited

U.S. PATENT DOCUMENTS

| 4,490,731 | A | 12/1984 | Vaught | 347/88 |
| 4,889,560 | A | 12/1989 | Jaeger et al. | 106/31.29 |
| 4,889,761 | A | 12/1989 | Titterington et al. | 428/32.1 |
| 5,195,430 | A | 3/1993 | Rise | 100/168 |
| 5,221,335 | A | 6/1993 | Williams et al. | 524/560 |
| 5,245,165 | A | 9/1993 | Zhang | 235/454 |
| 5,372,852 | A | 12/1994 | Titterington et al. | 427/288 |
| 5,389,958 | A | 2/1995 | Bui et al. | 347/103 |
| 5,496,879 | A | 3/1996 | Griebel et al. | 524/320 |

(Continued)

FOREIGN PATENT DOCUMENTS

EP   2 028 240 A1   2/2009

OTHER PUBLICATIONS

U.S. Patent Application filed Mar. 7, 2007, of Gabriel Iftime, et al., U.S. Appl. No. 11/683,011, entitled "Dual Printer for Regular and Raised Print" 18 pages of specification, 2 drawing sheets, US. Patent 8, 061, 791.

(Continued)

*Primary Examiner* — Elena T Lightfoot
(74) *Attorney, Agent, or Firm* — Marylou J. Lavoie

(57) ABSTRACT

A system and method for creating an authentication mark on a recording medium by depositing marking material on a medium in an image area to create a marking material image and to create a marking material authentication image. The method comprises (a) depositing marking material directly onto a recording medium in an image area to create a marking material image and in an authentication image area to create a marking material authentication image, wherein the marking material is an ultraviolet curable phase change ink composition comprising an optional colorant and a phase change ink vehicle comprising a radiation curable monomer or prepolymer; a photoinitiator; a reactive wax; and a gellant; (b) depositing a predetermined amount of additional marking material upon the authentication image area to increase an amount of marking material associated with the marking material authentication image in the authentication image area; and (c) curing the marking material upon the recording medium such that the fixed marking material associated with the authentication image area is a tactilely perceptible authentication mark, the fixed marking material associated with the tactilely perceptible authentication mark having a first height, the first height being tactilely perceptible.

12 Claims, 1 Drawing Sheet

(56) References Cited

U.S. PATENT DOCUMENTS

| | | | |
|---|---|---|---|
| 5,621,022 A | 4/1997 | Jaeger et al. | 523/161 |
| 5,627,578 A | 5/1997 | Weintraub | 347/101 |
| 6,004,419 A | 12/1999 | Torii | |
| 6,520,084 B1 * | 2/2003 | Gelbart | 101/401.1 |
| 6,644,763 B1 | 11/2003 | Gothait | 347/1 |
| 7,259,275 B2 | 8/2007 | Belelie et al. | 560/169 |
| 7,271,284 B2 | 9/2007 | Toma et al. | 560/169 |
| 7,276,614 B2 | 10/2007 | Toma et al. | 554/37 |
| 7,279,587 B2 | 10/2007 | Odell et al. | 554/37 |
| 2003/0179270 A1 * | 9/2003 | Yamamoto et al. | 347/102 |
| 2007/0120910 A1 | 5/2007 | Odell et al. | 347/88 |
| 2007/0120925 A1 | 5/2007 | Belelie et al. | 347/100 |
| 2007/0123606 A1 | 5/2007 | Toma et al. | 523/160 |
| 2007/0142492 A1 | 6/2007 | Odell et al. | |
| 2008/0000384 A1 | 1/2008 | Belelie et al. | |
| 2008/0087190 A1 | 4/2008 | Iftime et al. | 106/31.15 |
| 2008/0090928 A1 | 4/2008 | Iftime et al. | 522/75 |
| 2008/0121727 A1 | 5/2008 | Iftime et al. | 235/494 |
| 2008/0122914 A1 | 5/2008 | Toma et al. | |
| 2008/0151310 A1 | 6/2008 | Kazmaier et al. | 358/3.28 |
| 2008/0204538 A1 | 8/2008 | Kovacs et al. | |
| 2008/0218540 A1 | 9/2008 | Iftime et al. | |
| 2008/0218570 A1 | 9/2008 | Kovacs et al. | |
| 2010/0053287 A1 | 3/2010 | Belelie et al. | |
| 2010/0055407 A1 | 3/2010 | Belelie et al. | |
| 2010/0055415 A1 | 3/2010 | Belelie et al. | |
| 2010/0055423 A1 | 3/2010 | Chretien et al. | |

OTHER PUBLICATIONS

"Dimer Acids," Kirk-Othmer Encyclopedia of Chemical Technology, vol. 8, 4th Ed. (1992), pp. 223 to 237.

European Search Report, Application No. 09167959.7-2102, dated Dec. 23, 2009, 5 pages.

Advisory Action issued in U.S. Appl. No. 12/204,462, mailed Oct. 13, 2011, 5 pages.

Final Rejection issued in U.S. Appl. No. 12/204,462, mailed Aug. 1, 2011, 9 pages.

Non-Final Office Action issued in U.S. Appl. No. 12/204,462, mailed Apr. 4, 2011, 30 pages.

Final Rejection issued in U.S. Appl. No. 12/204,307, mailed Feb. 27, 2012, 23 pages.

Non-Final Office Action issued in U.S. Appl. No. 12/204,307, mailed Aug. 2, 2011, 33 pages.

Non-Final Office Action issued in U.S. Appl. No. 12/204,410, mailed Aug. 18, 2011, 105 pages.

Final Rejection issued in U.S. Appl. No. 12/204,410, mailed Feb. 13, 2012, 25 pages.

Interview Summary issued in U.S. Appl. No. 12/204,269, mailed May 4, 2012, 3 pages.

Non-Final Office Action issued in U.S. Appl. No. 12/204,269, mailed Nov. 22, 2011, 20 pages.

Advisory Action issued in U.S. Appl. No. 12/204,269, mailed Oct. 11, 2011, 4 pages.

Final Rejection issued in U.S. Appl. No. 12/204,269, mailed May 26, 2011, 18 pages.

Non-Final Office Action issued in U.S. Appl. No. 12/204,269, mailed Nov. 24, 2010, 23 pages.

Translation of Opposition Brief filed in European Patent Application No. 09 167 868, dated May 30, 2013, 21 pages.

Response to Opposition Brief filed in European Patent Application No. 09 167 868, dated Jan. 21, 2014, 16 pages.

* cited by examiner

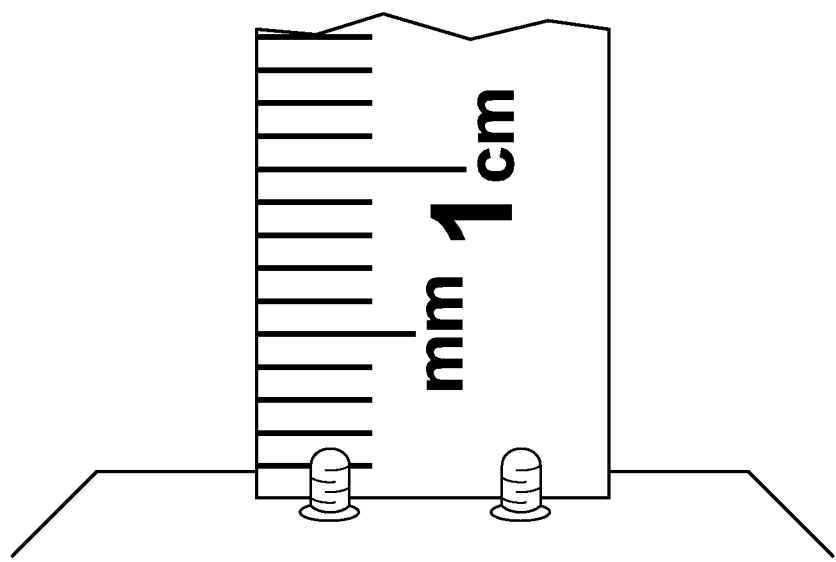

ND PRINT APPLICATIONS FOR SIGNATURE AND DOCUMENT AUTHENTICATION

ULTRA-VIOLET CURABLE GELLANT INKS FOR TACTILE AND REGULAR PRINT APPLICATIONS FOR SIGNATURE AND DOCUMENT AUTHENTICATION

RELATED CASES

Commonly assigned, co-pending U.S. Patent Application of Jennifer L. Belelie, Michelle N. Chrétien, Barkev Keoshkerian, Gabriel Iftime, Naveen Chopra, Christopher A. Wagner, Peter G. Odell, and Paul F. Smith, Ser. No. 12/204,269, entitled "Ultra-violet Curable Gellant Inks for Braille, Raised Print, and Regular Print Applications," filed of even date herewith, which is hereby incorporated by reference herein in its entirety, describes, in embodiments, an ink jet printing device including an ink jet print head and a print region surface toward which ink is jetted from the ink jet print head, wherein a height distance between the ink jet print head and the print region surface is adjustable; wherein the ink jet print head jets an ultra-violet curable phase change ink composition comprising an optional colorant and a phase change ink vehicle comprising a radiation curable monomer or prepolymer; a photoinitiator; a reactive wax; and a gellant; wherein a print deposited upon the print region surface is Braille, raised print, or a combination of regular print and one or both of Braille and raised print.

Commonly assigned, co-pending U.S. Patent Application of Michelle N. Chrétien, Barkev Keoshkerian, Peter G. Odell, Jennifer L. Belelie, Christopher A. Wagner, and Naveen Chopra, Ser. No. 12/204,307, entitled "Ultra-violet Curable Gellant Inks for Three Dimensional Printing and Digital Fabrication," filed of even date herewith, which is hereby incorporated by reference herein in its entirety, describes, in embodiments, a three-dimensional printing and fabrication method including depositing a first amount of an ultraviolet curable phase change ink composition comprising an optional colorant and a phase change ink vehicle comprising a radiation curable monomer or prepolymer; a photoinitiator; a reactive wax; and a gellant; successively depositing additional amounts of the ultraviolet curable phase change ink composition to create a three-dimensional object; and curing the ultraviolet curable phase change ink composition.

Commonly assigned, co-pending U.S. Patent Application of Jennifer L. Belelie, Michelle N. Chrétien, Naveen Chopra, Barkev Keoshkerian, and Steve E. Ready, Ser. No. 12/204,410, entitled "Tactile Text and Images for Packaging Applications," filed of even date herewith, which is hereby incorporated by reference herein in its entirety, describes, in embodiments, a method for forming tactile images or a combination of tactile images and regular images, on a flexible packaging substrate comprising depositing an ultraviolet curable phase change ink composition comprising an optional colorant and a phase change ink vehicle comprising a radiation curable monomer or prepolymer; a photoinitiator; a reactive wax; and a gellant directly onto a flexible packaging substrate or depositing the ink onto an intermediate transfer member, in an image area to form a tactile image area or a combination of tactile image area and regular image; forming the tactile image by depositing multiple layers of the ink in locations of the tactile image or portion thereof; when an intermediate transfer member is used, transferring the deposited ink from the intermediate transfer member to the flexible packaging substrate; and curing the ink.

Commonly assigned, co-pending U.S. Patent Application of Michelle N. Chrétien, Jennifer L. Belelie, Barkev Keoshkerian, and Gabriel Iftime, Ser. No. 12/204,462, entitled "Ultra-violet Curable Gellant Inks for Document Security Applications," filed of even date herewith, which is hereby incorporated by reference herein in its entirety, describes, in embodiments, a machine readable code comprising a set of printed markings created with an ultra-violet curable phase change ink comprising an optional colorant and a phase change ink vehicle comprising a radiation curable monomer or prepolymer; a photoinitiator; a reactive wax; and a gellant; wherein each printed marking of the set has a predetermined print height on a substrate and represents a predetermined data value, wherein the set of printed markings includes printed markings representing different data value and having different print heights.

Commonly assigned, co-pending U.S. patent application of Gabriel Iftime et al, Ser. No. 11/683,011, entitled "Dual Printer for Regular and Raised Print," filed Mar. 7, 2007, which is hereby incorporated by reference herein in its entirety, describes, in embodiments, an ink jet printing device including an ink jet print head and a print region surface toward which ink is jetted from the ink jet print head, wherein a height distance between the ink jet print head and the print region surface is adjustable. The ink jet printing device is thus a dual printing device capable of printing both regular height and raised height images such as Braille.

BACKGROUND

Disclosed herein are ultra-violet curable gellant inks for tactile and regular print applications, in specific embodiments as security features for signature and document authentication. Also described is a method for forming signature and document authentication security features with the described ultra-violet curable gellant inks.

Document authentication is an increasingly important issue, such as for agencies, including government organizations that frequently issue secure documentation. For example, Ontario Driver's Licenses have recently employed raised text signatures, birthdates, and license numbers for security purposes. See, for example, http://news.therecord.com/News/CanadaWorld/article/279991.

With the general availability of high quality color reproduction, distinguishing an original from a copy and verifying, for example, a signature, on the original has become more difficult. More specifically, digital printers, scanners, and image editing software have made it possible for copies of legitimate documents to be made that are difficult to distinguish from the original.

One conventional approach to authenticating documents is the use of machine readable encoded data which is rendered onto a document or other physical media along with other information.

For example, authenticating information can be encoded into thousands of tiny, individual glyph elements. Each element consists of a small 45 degree diagonal line, as short as 1/100th of an inch or less, depending on the resolution of the printing and scanning that is used. Each glyph represents either binary 0 or binary 1, depending on whether the glyph slopes to the left or right. Sequences of glyphs can be used to encode numeric, textual, or other information. The glyphs are grouped together on the page, where the glyphs form unobtrusive, evenly textured gray areas, similar to a half-toned picture.

Another conventional approach to the problem of verifying document authenticity is the use of authenticating information embedded in a print, for example, a seal or a date and time. The embedded authenticating information catches the light when the print is tilted and can be seen as an additional and separate image. Moreover, watermarks, conventionally, have also been used to authenticate a document.

These various conventional methods of verifying a document share the feature that it is very difficult to reproduce the authenticating feature of the original on a conventional copier or scanner. Therefore, a copy of the original can be distinguished from the original.

However, the conventional methods of verifying a document have drawbacks. For example, glyphs need a device to decode the authenticating information. Moreover, conventional watermarks need a proper source of light to discern the authenticating information. In these various conventional methods, outside intervention; e.g., from either a machine (optical reader) or a light source; is needed to detect or discern the authenticating information.

Commonly assigned, co-pending U.S. patent application of Peter M. Kazmaier, Hadi K. Mahabadi, Paul F. Smith, Chris A. Wagner, Gabriel Iftime, and Tyler B. Norsten, Ser. No. 11/613,759, entitled "Tactile Security Feature for Document and Signature Authentication," filed Dec. 20, 2006, which is hereby incorporated by reference herein in its entirety, describes, in embodiments, a system and method create an authentication mark on a recording medium by depositing marking material on a medium in an image area to create a marking material image and to create a marking material authentication image. A predetermined amount of additional marking material is further deposited upon the medium in the authentication image area to increase an amount of marking material associated with the marking material authentication image in the authentication image area. The fixed marking material associated with the authentication image area is a tactilely perceptible authentication mark wherein the fixed marking material associated with the authentication mark has a height, with respect to a surface of the medium that is tactilely perceptible.

U.S. Pat. No. 6,644,763 describes a method for creating raised and special printing effects using ink jet technology. The method includes the steps of depositing a light curable photo-polymer material on the area selected for the printing effects, and curing the area. The amount of material to be deposited corresponds to the area selected for the printing effects and the height of the raised area relative to the medium on which the photo-polymer material is deposited. See the Abstract.

U.S. Pat. No. 5,627,578 describes a method and device for raised letter or graphics printing, by means of a sprayed wet ink deposition on a print recording medium. Subsequent dispensing of thermographic powder thereon, with adherence of the powder only to the wet ink, followed by heating to a fixing temperature of the powder, results in the raised lettering or graphics. A standard portable ink jet printer of the bubble jet type, controlled, with graphics software control, by a personal computer, provides the requisite non-contacting ink deposition. The dispensing cartridges of the ink jet printer are provided with non-contact-drying ink formulations (with two or more separate colors, if desired) for the portion of graphics or printing which is to be in raised form. A thermographic powder dispenser and heating member is connected to the output of the ink jet printer, or integrated therewith for completion of the raised printing process. Raised and non-raised printing is also possible by use of separately dispensed drying and non-drying inks. See the Abstract.

Ink jet printing devices are known in the art. For example, ink jet printing devices are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are generally three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (that is, liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device, the image is applied by jetting appropriately colored inks during four to eighteen rotations (incremental movements) of a recording medium, such as an image receiving member or intermediate transfer member, with respect to the ink jetting head. That is, there is a small translation of the print head with respect to the recording medium in between each rotation. This approach simplifies the print head design, and the small movements ensure good droplet registration. At the jet operating temperature, droplets of liquid ink are ejected from the printing device. When the ink droplets contact the surface of the recording medium, they quickly solidify to form a predetermined pattern of solidified ink drops.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing solid ink for printing on a recording medium such as paper. In thermal ink jet printing processes employing hot melt inks, the solid ink is melted by the heater in the printing apparatus and utilized (jetted) as a liquid in a manner similar to that of conventional thermal ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

The use of ink jet printers in forming raised printed images is also known, for example, as indicated in U.S. Pat. Nos. 6,644,763 and 5,627,578 above. However, these printers for forming raised images are typically dedicated machines designed and used solely for raised print applications, such as forming Braille images. Where a user requires only a certain portion of print jobs to be done utilizing raised print, it can be costly for the user to have two print devices, one strictly for the raised print jobs.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While known compositions and processes are suitable for their intended purposes, a need remains for a method that enables authentication of an original document without the utilization of outside intervention; e.g. from either a machine (optical reader) or a light source. Moreover, it is desirable to provide a method that enables authentication of an original document through tactile perception. Furthermore, it is desirable to provide a method that enables authentication of an original document through tactile perception while preventing the authenticating information of the original document from being reproduced using conventional scanners and printers. Further, a need remains for a robust marking material compatible with a printing device that can produce regular text and tactile security features.

The appropriate components and process aspects of the each of the foregoing U.S. Patents and Patent Publications may be selected for the present disclosure in embodiments thereof.

SUMMARY

A method and material for creating an authentication mark on a recording medium is disclosed comprising (a) depositing marking material directly onto a recording medium or depositing marking material onto an intermediate transfer member, in an image area to create a marking material image and in an authentication image area to create a marking material authentication image, wherein the marking material is an ultraviolet curable phase change ink composition comprising an optional colorant and a phase change ink vehicle comprising a radiation curable monomer or prepolymer; a photoinitiator; a reactive wax; and a gellant; (b) depositing a predetermined amount of additional marking material upon the authentication image area to increase an amount of marking material associated with the marking material authentication image in the authentication image area; (c) when an intermediate transfer member is used, transferring the deposited marking material from the intermediate transfer member to the recording medium; and (d) curing the marking material upon the recording medium such that the fixed marking material associated with the authentication image area is a tactilely perceptible authentication mark, the fixed marking material associated with the tactilely perceptible authentication mark having a first height, the first height being tactilely perceptible.

Further disclosed is an authentication mark disposed on a recording medium comprising an authentication image area and a marking material image area; wherein the fixed marking material associated with the authentication image area is a tactilely perceptible authentication mark having a height, with respect to a surface of the medium, that is tactilely perceptible; wherein the fixed marking material associated with the marking material image area is tactilely non-perceptible; and wherein the authentication mark comprises an ultraviolet curable phase change ink composition comprising an optional colorant and a phase change ink vehicle comprising a radiation curable monomer or prepolymer; a photoinitiator; a reactive wax; and a gellant.

BRIEF DESCRIPTION OF THE DRAWINGS

FIG. 1 is an illustration of free-standing structures created by ink jet deposition of the present ultra-violet curable phase change ink material onto room temperature plastic using a piezoelectric ink jet printer followed by curing.

DETAILED DESCRIPTION

A method is provided that enables authentication of an original document without the utilization of outside intervention; e.g. from either a machine (optical reader) or a light source. The method enables authentication of an original document through tactile perception. Furthermore, the method enables authentication of an original document through tactile perception while preventing the authenticating information of the original document from being reproduced using conventional scanners and printers.

Tactile perception is based upon the physical sense of touch and thus tactile perception can be realized without utilizing a source of light or optical reader. In contrast, the various conventional methods of authenticating an original document require visual perception.

FIG. 1 illustrates authentication marks that have been deposited upon a Mylar recording medium created with the present ultraviolet curable phase change gellant ink marking material. The marking material can be used to generate tactilely perceptible images. The marking material resides primarily on the surface of the paper creating a raised image. Repeated layering of the ink marking material in this manner may be used to generate an ink pile height that is tactilely perceptible.

In embodiments, a predetermined mark is used so that the authenticator of the printed medium will be apprised of the authentication criteria.

The predetermined mark can be printed directly onto a recording medium or to an intermediate transfer member (such as an imaging drum) and then subsequently transferred to the final recording medium. It is noted that multiple transfer passes may be needed to attain a tactilely perceptible ink pile height.

The authenticator of the printed medium uses the sense of touch to determine if the authentication mark is present. If the mark is not present, the medium is not authenticated. It is noted that the authenticating mark may be present visually, but the mark is still not authenticated unless it can be detected tactilely. The medium with the tactilely perceptible authenticating mark may be duplicated using a conventional scanner or copier. However, the duplicate, although it may have a visually perceptible authenticating mark, will not have the tactilely perceptible authenticating mark.

The authenticating mark can be selected using hardware or software connected to a printer through a conventional computer network.

The portion of the image to be tactilely perceived will be the identifying signature or mark used for authentication. The identifying mark could be, for example, a letterhead, an image of a personal signature, logo, or a tactilely perceptible code, although not limited to these examples.

Multiple printing passes can be used to cause the identifying mark to have a marking material pile height that is tactilely perceptible. In embodiments, the method herein comprises depositing successive layers of the marking material to form the tactilely perceptible authentication mark. For example, a marking material pile height of at least 31 microns is perceptible through the sense of touch, whereas conventional solid ink printing or xerography produces a marking material pile height of no more that 10 microns which is not tactilely perceptible.

In embodiments, an authentication mark is created on a recording medium by depositing the present ultraviolet curable phase change gellant ink marking material on a recording medium in an image area to create a tactilely non-perceptible image and in an authentication image area to create a tactilely non-perceptible marking material authentication image; depositing a predetermined amount of additional marking material upon the recording medium in the authentication image area to increase an amount of marking material associated with the marking material authentication image; and curing the marking material upon the recording medium such that the cured marking material associated with the authentication image area is a robust, tactilely perceptible authentication mark.

The authentication mark marking image area and authentication image area can be cured at any time in the process. In embodiments, when multiple layers of the marking material are successively deposited at authentication image areas, the layers can be cured upon completion of deposition of a last of the multiple layers. In another embodiment, each layer of the marking material can be cured prior to the deposition of a subsequent layer.

The present ultraviolet curable gellant ink materials, as well as the methods herein, may be employed with any desired printing system and marking material suitable for applying a marking material in an imagewise pattern directly to an image receiving recording medium or to an intermediate transfer member, such as ink jet printing, thermal ink jet printing, piezoelectric ink jet printing, acoustic ink jet printing, thermal transfer printing, gravure printing, electrostatographic printing methods, and the like.

In a specific embodiment, the apparatus is an ink jet printing device as described in commonly assigned, co-pending U.S. patent application of Gabriel Iftime et al, Ser. No. 11/683,011, entitled "Dual Printer for Regular and Raised Print," filed Mar. 7, 2007, incorporated by reference herein in its entirety that includes at least an ink jet print head and a print region surface toward which ink is jetted from the ink jet print head, wherein a height distance between the ink jet print head and the print region surface is adjustable. In embodiments herein, a device for creating an authentication mark on a recording medium comprises an ink jet print head and a print region surface toward which ink is jetted from the ink jet print head, wherein a height distance between the ink jet print head and the print region surface is adjustable; wherein the ink jet print head jets an ultra-violet curable phase change ink composition comprising an optional colorant and a phase change ink vehicle comprising a radiation curable monomer or prepolymer; a photoinitiator; a reactive wax; and a gellant to provide a three-dimensional object.

In specific embodiments herein, the marking material comprises an ultra-violet curable phase change ink composition comprising an optional colorant and a phase change in vehicle comprising at least one radiation curable monomer or prepolymer; a photoinitiator; a reactive wax; and a gellant.

The raised text or authentication image can be formed by repeatedly depositing ink on the same area until a tactile-perceptible height is achieved. A tactile-perceptible height is one that is easily identified by touch. For example, in embodiments, a tactile-perceptible height is at least about 31 micrometers to about 6 millimeters, or about 31 micrometers, or from about 50 micrometers to about 100 micrometers. In embodiments, the authentication mark has an authentication image area having a height of at least 31 micrometers. The robust marking materials disclosed herein are particularly advantageous because many of the documents created will be handled repeatedly. The ultraviolet curable phase change gellant ink marking materials herein further provide a wide recording medium latitude including, but not limited to, plain and coated papers and flexible recording mediums, which enables printing on any type of document required. The ultraviolet curable phase change gellant ink marking materials herein have little to no penetration into the recording medium, residing primarily on the surface of the document, thereby enhancing creation of a textured surface. The gel nature of the marking material at room temperature prevents spread or migration of the printed droplet and enables facile formation of the raised authentication text or image. Both normal and raised print can be generated on the same document, using the same ink marking material. The present cured inks are extremely robust materials.

In specific embodiments, the ink vehicles disclosed herein can comprise any suitable curable monomer or prepolymer. Examples of suitable materials include radically curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures and combinations thereof. When a reactive diluent is added to the ink carrier material, the reactive diluent is added in any desired or effective amount, in one embodiment at least about 1 percent by weight of the carrier, and in another embodiment at least about 35 percent by weight of the carrier, and in one embodiment no more than about 80 percent by weight of the carrier, and in another embodiment no more than about 70 percent by weight of the carrier, although the amount of diluent can be outside of these ranges.

In embodiments, the ink vehicles contain at least one compound that can exhibit gel-like behavior in that it undergoes a relatively sharp increase in viscosity over a relatively narrow temperature range when dissolved in a liquid such as those compounds that behave as curable monomers when exposed to radiation such as ultraviolet light. One example of such a liquid curable monomer is a propoxylated neopentyl glycol diacrylate such as SR9003, commercially available from Sartomer Co. Inc.

In one embodiment, some compounds as disclosed herein undergo a change in viscosity of at least about $10^3$ centipoise, in another embodiment at least about $10^4$ centipoise, and in yet another embodiment at least about $10^5$ centipoise over a temperature range of in one embodiment at least about 30° C., in another embodiment at least about 10° C., and in yet another embodiment at least about 5° C., although the viscosity change and temperature range can be outside of these ranges, and compounds that do not undergo changes within these ranges are also included herein.

At least some embodiments of the compounds disclosed herein can form a semi-solid gel at a first temperature. For example, when the compound is incorporated into a phase change ink, this temperature is below the specific temperature at which the ink is jetted. The semi-solid gel phase is a physical gel that exists as a dynamic equilibrium comprising one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, or the like, which, upon stimulation by physical forces, such as temperature, mechanical agitation, or the like, or chemical forces, such as pH, ionic strength, or the like, can undergo reversible transitions from liquid to semi-solid state at the macroscopic level. The solutions containing the gellant molecules exhibit a thermally reversible transition between the semi-solid gel state and the liquid state when the temperature is varied above or below the gel point of the solution. This reversible cycle of transitioning between semi-solid gel phase and liquid phase can be repeated many times in the solution formulation.

In specific embodiments, the ink vehicles disclosed herein can comprise any suitable photoinitiator. Examples of specific initiators include, but are not limited to, Irgacure® 127, Irgacure® 379, and Irgacure® 819, all commercially available from Ciba Specialty Chemicals, among others. Further examples of suitable initiators include (but are not limited to) benzophenones, benzophenone derivatives, benzyl ketones, monomeric hydroxyl ketones, polymeric hydroxyl ketones, α-amino ketones, acyl phosphine oxides, metallocenes, benzoin ethers, benzil ketals, α-hydroxyalkylphenones, α-aminoalkylphenones, acylphosphine photoinitiators sold under the trade designations of IRGACURE and DAROCUR from Ciba, and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone, 2,4,6-trimethylbenzoyldiphenylphosphine oxide (available as BASF LUCIRIN TPO), 2,4,6-trimethylbenzoylethoxyphenylphosphine oxide (available as BASF LUCIRIN TPO-L), bis(2,4,6-trimethylbenzoyl)-phenyl-phosphine oxide (available as Ciba IRGACURE 819) and other acyl phosphines, 2-methyl-1-(4-(methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959), 2-benzyl 2-dimethylamino 1-(4-morpholinophenyl) butanone-1 (available as Ciba IRGACURE 369), 2-hydroxy-1-(4-(4-(2-hydroxy-2-methylpropionyl)-benzyl)-phenyl)-2-methylpropan-1-one (available as Ciba IRGACURE 127), 2-dimethylamino-2-(4-methylbenzyl)-1-(4-morpholin-4-ylphenyl)-butanone (available as Ciba IRGACURE 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, arylsulphonium slats, aryl iodonium salt, and the like, as well as mixtures thereof.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

Optionally, the photoinitiator is present in the phase change ink in any desired or effective amount, in one embodiment at least about 0.5 percent by weight of the ink composition, and in another embodiment at least about 1 percent by weight of the ink composition, and in one embodiment no more than about 15 percent by weight of the ink composition, and in another embodiment no more than about 10 percent by weight of the ink composition, although the amount can be outside of these ranges.

Any suitable reactive wax can be used for the phase change in vehicles disclosed herein. In embodiments, the reactive wax comprises a curable wax component that is miscible with the other components and that will polymerize with the curable monomer to form a polymer. Inclusion of the wax promotes an increase in viscosity of the ink as it cools from the jetting temperature.

Suitable examples of waxes include, but are not limited to, those that are functionalized with curable or polymerizable groups. The curable groups may include, but are not limited to, acrylate, methacrylate, alkene, allylic ether, epoxide and oxetane. These waxes can be synthesized by the reaction of a wax equipped with a transformable functional group, such as carboxylic acid or hydroxyl.

In embodiments, the reactive wax is a hydroxyl-terminated polyethylene wax functionalized with a polymerizable group. Suitable examples of hydroxyl-terminated polyethylene waxes that may be functionalized with a curable group include, but are not limited to, mixtures of carbon chains with the structure $CH_3—(CH_2)_n—CH_2OH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNELIN® 350, UNILIN® 425, UNELIN® 550 and UNELIN® 700 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

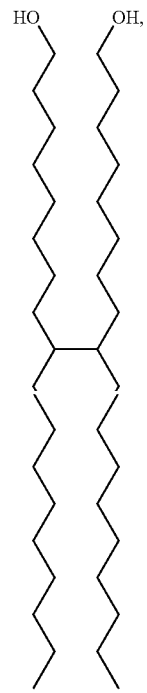

as well as other branched isomers which may include unsaturations and cyclic groups, available from Uniqema, New Castle, Del. Further information on C36 dimer diols of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference. These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILINO 350, UNILINO 425, UNWLINO 550 and UNWLINO 700.

Suitable examples of carboxylic acid-terminated polyethylene waxes that may be functionalized with a curable group include, but are not limited to, mixtures of carbon chains with the structure $CH_3—(CH_2)_n—COOH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNICID® 350, UNICID® 425, UNICID® 550 and UNICID® 700 with Mn equal to approximately 390, 475, 565 and 720 g/mol, respectively. Other suitable waxes have a structure $CH_3—(CH_2)_n—COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

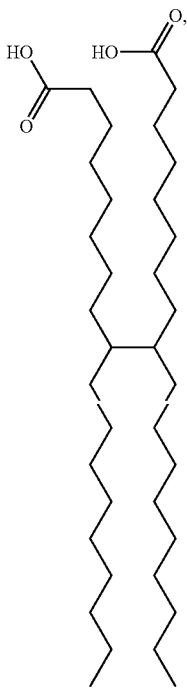

as well as other branched isomers which may include unsaturations and cyclic groups, available from Uniqema, New Castle, Del.; further information on C36 dimer acids of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference) can also be used. These carboxylic acids can be reacted with alcohols equipped with UV curable moieties to form reactive esters. Examples of these alcohols include, but are not limited to, 2-allyloxyethanol from Sigma-Aldrich Co.;

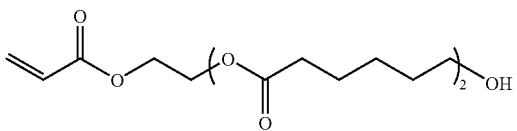

SR495B from Sartomer Company, Inc.;

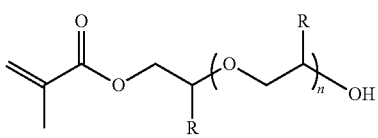

CD572 (R=H, n=10) and SR604 (R=Me, n=4) from Sartomer Company, Inc.

In embodiments, the optional curable wax is included in the ink in an amount of from, for example, about 1 to about 25% by weight of the ink, or from about 2 to about 20% by weight of the ink, or from about 2.5 to about 15% by weight of the ink, although the amounts can be outside of these ranges.

The curable monomer or prepolymer and curable wax together can form more than about 50% by weight of the ink, or at least 70% by weight of the ink, or at least 80% by weight of the ink, although not limited.

Any suitable gellant can be used for the ink vehicles disclosed herein. In embodiments, a gellant such as described in U.S. patent application Ser. No. 11/290,202, filed Nov. 30, 2005, entitled "Phase Change Inks Containing Photoinitiator With Phase Change Properties and Gellant Affinity," with the named inventors Peter G. Odell, Eniko Toma, and Jennifer L. Belelie, the disclosure of which is totally incorporated herein by reference, can be used, wherein the gellant is a compound of the formula

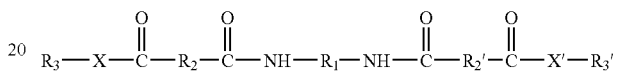

wherein $R_1$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 12 carbon atoms, in another embodiment with no more than about 4 carbon atoms, and in yet another embodiment with no more than about 2 carbon atoms, although the number of carbon atoms can be outside of these ranges, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 6 carbon atoms, although the number of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2$' each, independently of the other, are:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 54 carbon atoms, and in another embodiment with no more than about 36 carbon atoms, although the number of carbon atoms can be outside of these ranges, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 7 carbon atoms, although the number of carbon atoms can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 8 carbon atoms, although the number of carbon atoms can be outside of these ranges, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ and $R_3$' each, independently of the other, are either:

(a) photoinitiating groups, such as groups derived from 1-(4-(2-hydroxyethoxy)phenyl)-2-hydroxy-2-methylpropan-1-one, of the formula

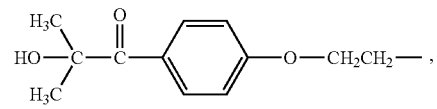

groups derived from 1-hydroxycyclohexylphenylketone, of the formula

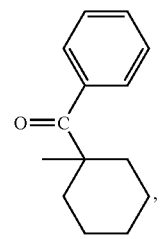

groups derived from 2-hydroxy-2-methyl-1-phenylpropan-1-one, of the formula

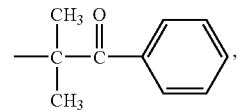

groups derived from N,N-dimethylethanolamine or N,N-dimethylethylenediamine, of the formula

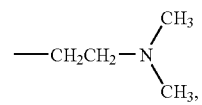

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), in one embodiment with at least about 2 carbon atoms, in another embodiment with at least about 3 carbon atoms, and in yet another embodiment with at least about 4 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (ii) an aryl group (including substituted and unsubstituted aryl groups, and wherein heteroatoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as tolyl or the like, wherein the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

provided that at least one of $R_3$ and $R_3'$ is a photoinitiating group;

and X and X' each, independently of the other, is an oxygen atom or a group of the formula $-NR_4-$, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, in one embodiment with at least 1 carbon atom, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iii) an aryl group, including substituted and unsubstituted aryl groups, and wherein heteroatoms either may or may not be present in the aryl group, in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, wherein the substituents on the substituted alkyl, aryl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, $R_2$ and $R_2'$ are the same as each other; in another specific embodiment, $R_2$ and $R_2'$ are different from each other. In one specific embodiment, $R_3$ and $R_3'$ are the same as each other; in another specific embodiment, $R_3$ and $R_3'$ are different from each other.

In one specific embodiment, $R_2$ and $R_2'$ are each groups of the formula $-C_{34}H_{56+a}-$ and are branched alkylene groups which may include unsaturations and cyclic groups, wherein a is an integer of 0, 1, 2, 3, 4, 5, 6, 7, 8, 9, 10, 11, or 12, including (but not limited to) isomers of the formula

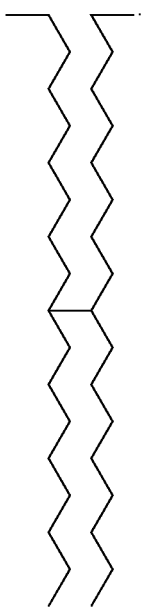 [SMILES: CCCCCCCCCC(CCCCCCCC)C(CCCCCCCC)CCCCCCCCC]
In one specific embodiment, $R_1$ is an ethylene (—CH$_2$CH$_2$—) group.
In one specific embodiment, $R_3$ and $R_3'$ are both
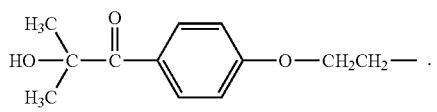
In one specific embodiment, the compound is of the formula
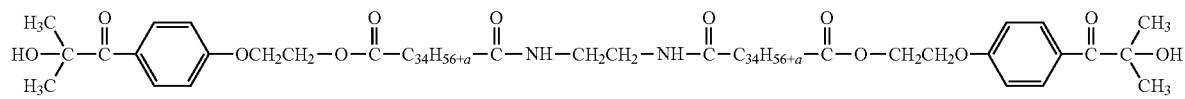
wherein —C$_{34}$H$_{56+a}$— represents a branched alkylene group which may include unsaturations and cyclic groups, wherein a is an integer of 0, 1, 2, 3, 4, 5, 6, 7, 8, 9, 10, 11, or 12, including (but not limited to) isomers of the formula
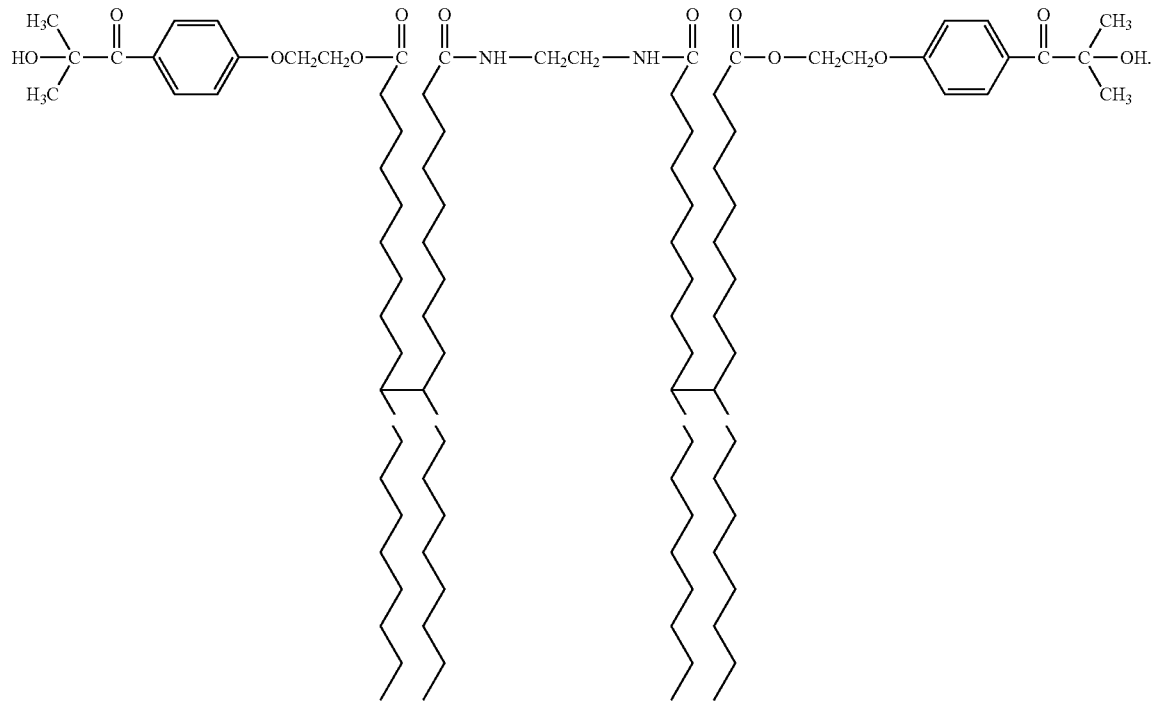

Additional specific examples of compounds of this formula include those of the formula

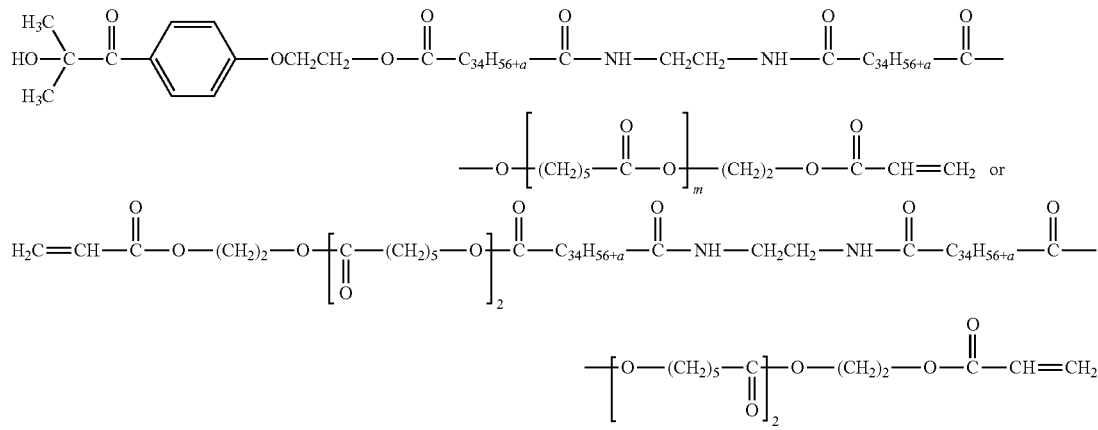

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein m is an integer, including but not limited to embodiments wherein m is 2, including (but not limited to) isomers of the formula wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein n is an integer, including but not limited to embodiments wherein n is 2 and wherein n is 5, including (but not limited to) isomers of the formula

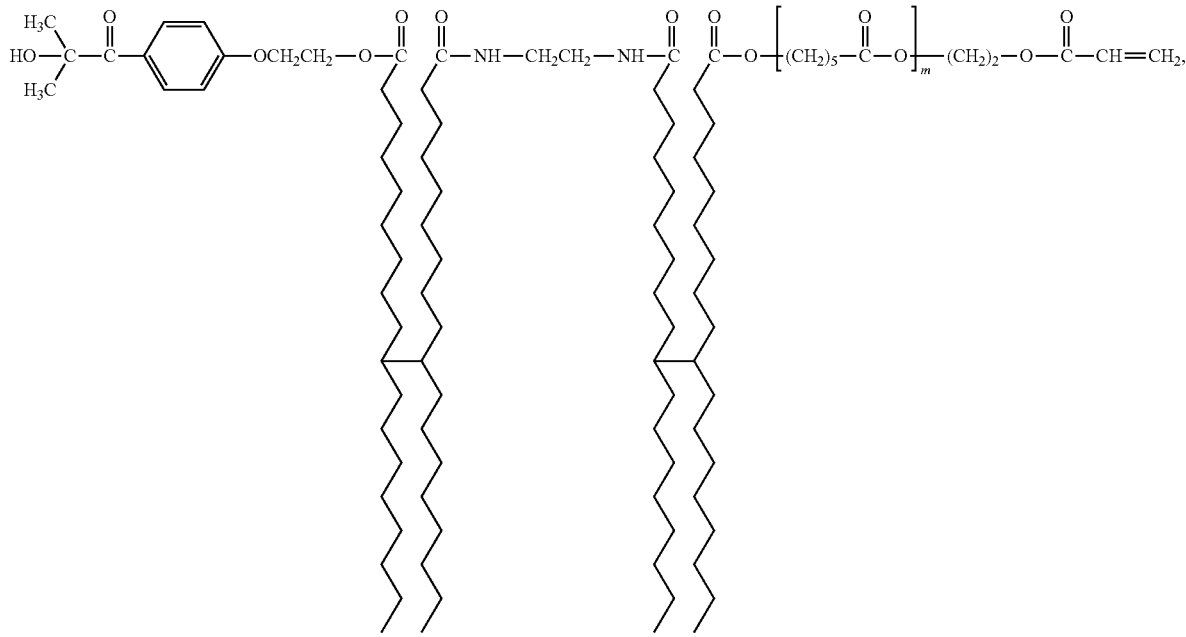

those of the formula

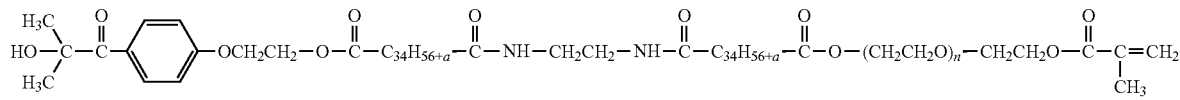

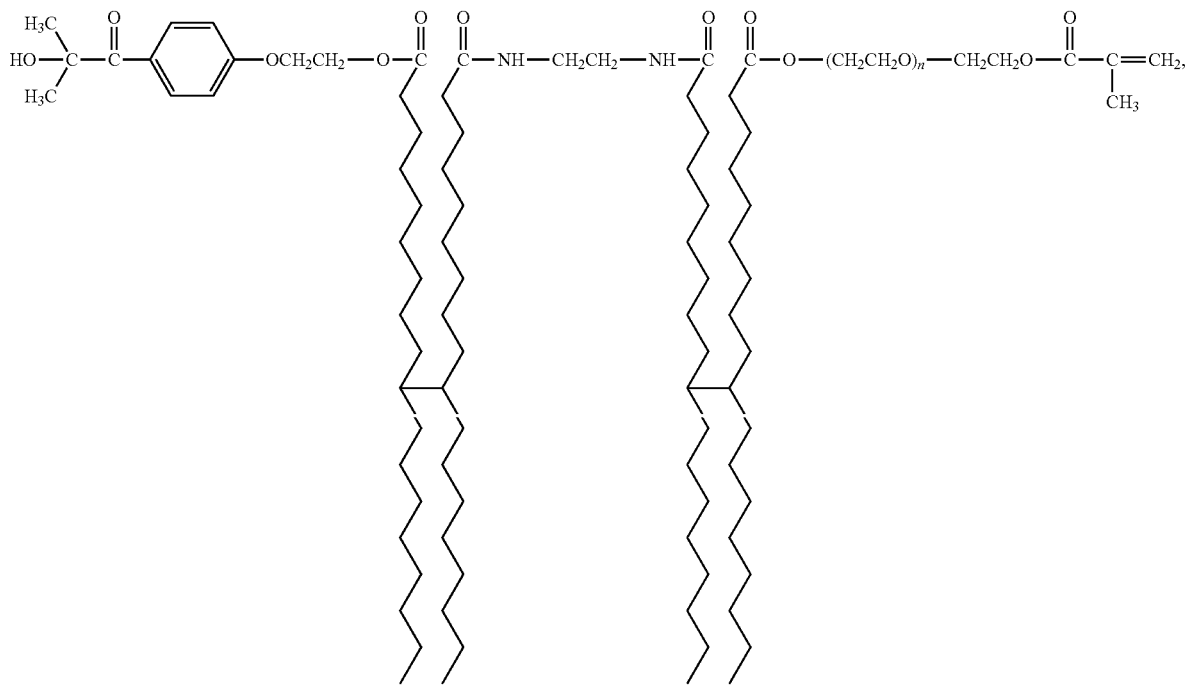
those of the formula
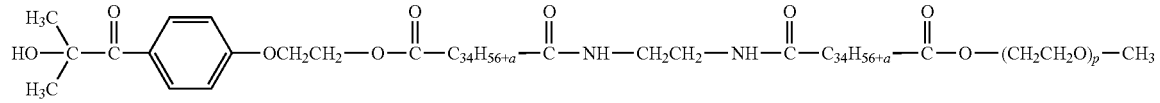
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein p is an integer, including but not limited to embodiments wherein p is 2 and wherein p is 3, including (but not limited to) isomers of the formula
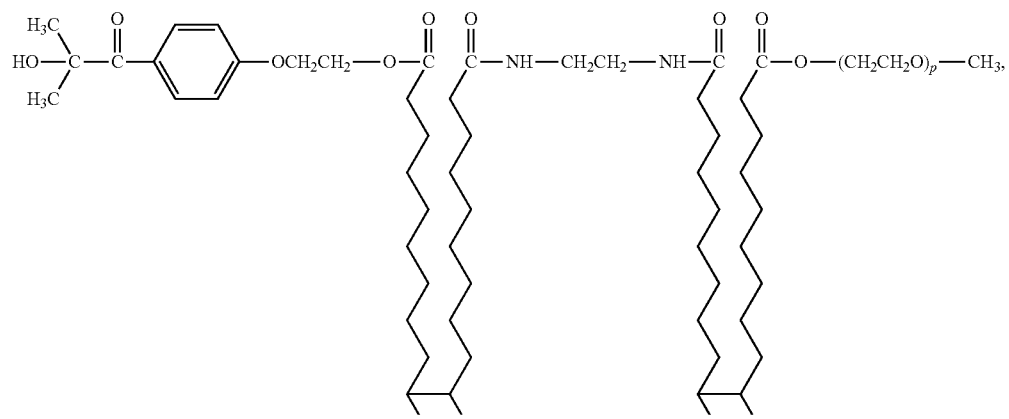

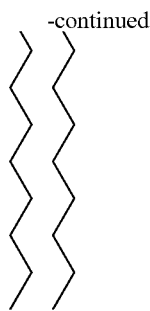

those of the formula

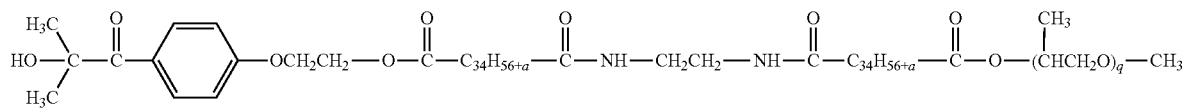

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein q is an integer, including but not limited to embodiments wherein q is 2 and wherein q is 3, including (but not limited to) isomers of the formula wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein r is an integer, including but not limited to embodiments wherein r is 2 and wherein r is 3, including (but not limited to) isomers of the formula

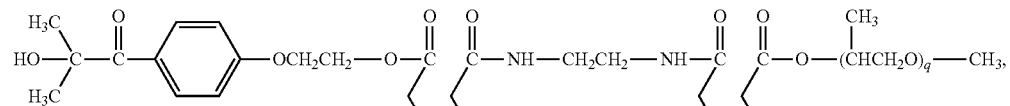
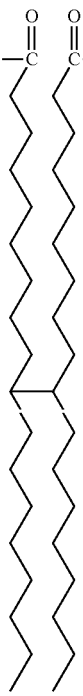

those of the formula

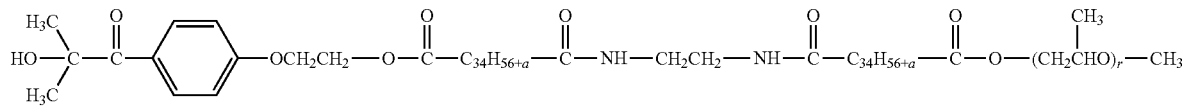

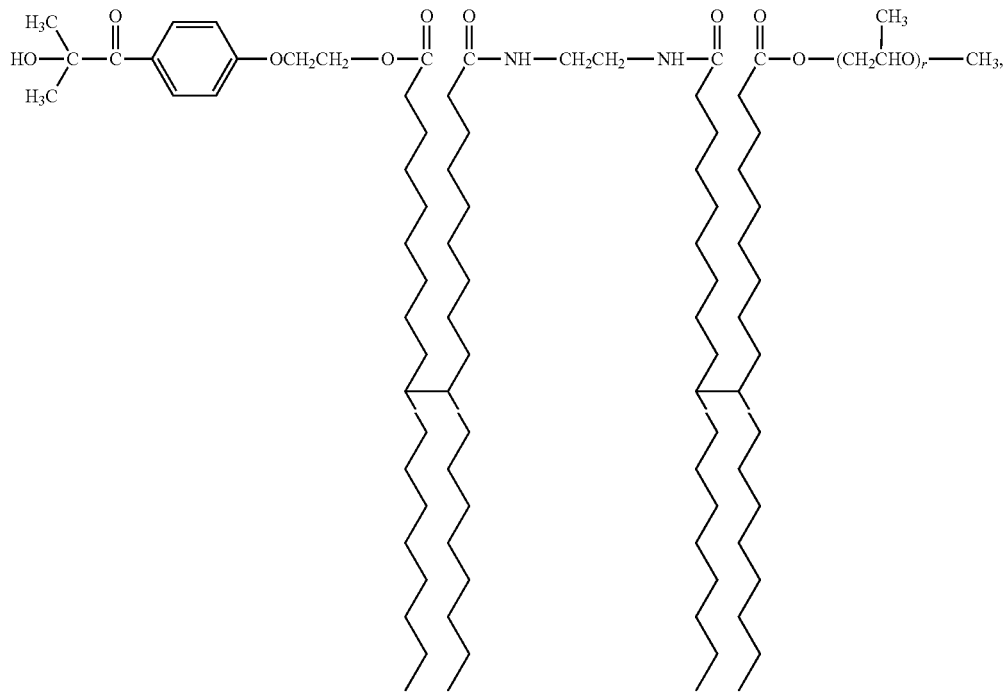

and the like, as well as mixtures thereof.

In embodiments, gellants herein can comprise materials disclosed in copending Application U.S. Ser. No. 11/290,121, filed Nov. 30, 2005, entitled "Phase Change Inks Containing Curable Amide Gellant Compounds," with the named inventors Eniko Toma, Jennifer L. Belelie, and Peter G. Odell, the disclosure of which is totally incorporated herein by reference, including a compound of the formula

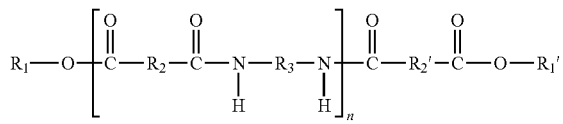

wherein $R_1$ and $R_1'$ each, independently of the other, is an alkyl group having at least one ethylenic unsaturation, an arylalkyl group having at least one ethylenic unsaturation, or an alkylaryl group having at least one ethylenic unsaturation, $R_2, R_2'$, and $R_3$ each, independently of the others, are alkylene groups, arylene groups, arylalkylene groups, or alkylarylene groups, and n is an integer representing the number of repeat amide units and is at least 1.

See also U.S. Pat. No. 7,279,587 of Peter G. Odell, Eniko Toma, and Jennifer L. Belelie, entitled "Photoinitiator with Phase Change Properties and Gellant Affinity," the disclosure of which is totally incorporated herein by reference, which discloses photoinitiating compounds useful in curable phase change ink compositions and U.S. Pat. No. 7,276,614 of Eniko Toma, Peter G. Odell, Adela Goredema, and Jennifer L. Belelie, entitled "Curable Amide Gellant Compounds," issued Oct. 2, 2007, which is hereby incorporated by reference herein in its entirety.

The gellant compounds as disclosed herein can be prepared by any desired or effective method.

For example, in embodiments, gellants can be prepared as described in U.S. Pat. No. 7,259,275, entitled "Method for Preparing Curable Amide Gellant Compounds," with the named inventors Jennifer L. Belelie, Adela Goredema, Peter G. Odell, and Eniko Toma, and the disclosure of which is totally incorporated herein by reference, which describes a process for preparing a compound of the formula

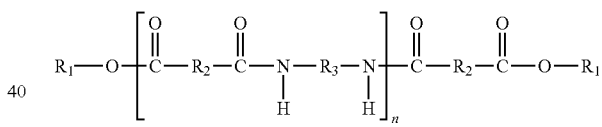

wherein $R_1$ is an alkyl group having at least one ethylenic unsaturation, an arylalkyl group having at least one ethylenic unsaturation, or an alkylaryl group having at least one ethylenic unsaturation, $R_2$ and $R_3$ each, independently of the others, are alkylene groups, arylene groups, arylalkylene groups, or alkylarylene groups, and n is an integer representing the number of repeat amide units and is at least 1, said process comprising: (a) reacting a diacid of the formula

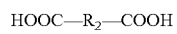

HOOC—$R_2$—COOH with a diamine of the formula

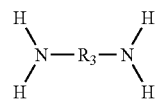

in the absence of a solvent while removing water from the reaction mixture to form an acid-terminated oligoamide intermediate; and (b) reacting the acid-terminated oligoamide intermediate with a monoalcohol of the formula

$R_1$—OH in the presence of a coupling agent and a catalyst to form the product.

See also, U.S. Pat. No. 7,279,587 of Jennifer L. Belelie, Adela Goredema, Peter G. Odell, and Eniko Toma entitled "Method for Preparing Curable Amide Gellant Compounds," issued Aug. 21, 2007, which is hereby incorporated by reference herein in its entirety, describes, in embodiments, a process for preparing a compound of the formula

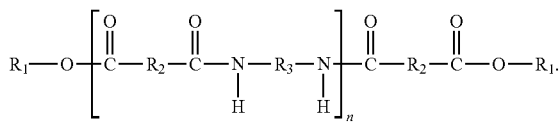

Further, see U.S. Pat. No. 7,271,284 of Eniko Toma, Adela Goredema, Jennifer L. Belelie, and Peter G. Odell entitled "Process for Making Curable Amide Gellant Compounds," issued Sep. 18, 2007, which is hereby incorporated by reference herein in its entirety, which describes, in embodiments, a process for preparing a compound of the formula

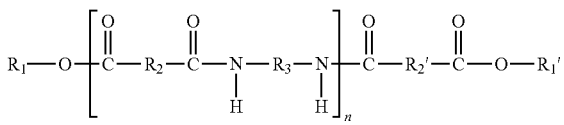

having substituents as defined therein.

The optional colorant, if present, may be present in a colored marking material in any desired amount, for example from about 0.5 to about 75% by weight of the marking material, for example from about 1 to about 50% or from about 1 to about 25%, by weight of the marking material.

Any suitable colorant can be used in embodiments herein, including dyes, pigments, or combinations thereof. As colorants, examples may include any dye or pigment capable of being dispersed or dissolved in the vehicle. Examples of suitable pigments include, for example, Paliogen Violet 5100 (BASF); Paliogen Violet 5890 (BASF); Heliogen Green L8730 (BASF); Lithol Scarlet D3700 (BASF); SUNFAST® Blue 15:4 (Sun Chemical 249-0592); HOSTAPERM Blue B2G-D (Clariant); Permanent Red P-F7RK; HOSTAPERM Violet BL (Clariant); Lithol Scarlet 4440 (BASF); Bon Red C (Dominion Color Company); Oracet Pink RF (Ciba); Paliogen Red 3871 K (BASF); SUNFAST® Blue 15:3 (Sun Chemical 249-1284); Paliogen Red 3340 (BASF); SUNFAST® Carbazole Violet 23 (Sun Chemical 246-1670); Lithol Fast Scarlet L4300 (BASF); Sunbrite Yellow 17 (Sun Chemical 275-0023); Heliogen Blue L6900, L7020 (BASF); Sunbrite Yellow 74 (Sun Chemical 272-0558); SPECTRA PAC® C. Orange 16 (Sun Chemical 276-3016); Heliogen Blue K6902, K6910 (BASF); SUNFAST® Magenta 122 (Sun Chemical 228-0013); Heliogen Blue D6840, D7080 (BASF); Sudan Blue OS (BASF); Neopen Blue FF4012 (BASF); PV Fast Blue B2GO1 (Clariant); Irgalite Blue BCA (Ciba); Paliogen Blue 6470 (BASF); Sudan Orange G (Aldrich); Sudan Orange 220 (BASF); Paliogen Orange 3040 (BASF); Paliogen Yellow 152, 1560 (BASF); Lithol Fast Yellow 0991 K (BASF); Paliotol Yellow 1840 (BASF); Novoperm Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); Hostaperm Pink E 02 (Clariant); Hansa Brilliant Yellow 5GX03 (Clariant); Permanent Yellow GRL 02 (Clariant); Permanent Rubine L6B 05 (Clariant); Fanal Pink D4830 (BASF); Cinquasia Magenta (Du Pont), Paliogen Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Example solvent dyes include spirit soluble dyes such as Neozapon Red 492 (BASF); Orasol Red G (Ciba); Direct Brilliant Pink B (Global Colors); Aizen Spilon Red C—BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

The radiation curable phase change inks herein can also optionally contain an antioxidant. The optional antioxidants can protect the images from oxidation and can also protect the ink components from oxidation during the heating portion of the ink preparation process. Specific examples of suitable antioxidant stabilizers include (but are not limited to) NAUGARD® 524, NAUGARD® 635, NAUGARD® A, NAUGARD® 1-403, and NAUGARD® 959, commercially available from Crompton Corporation, Middlebury, Conn.; IRGANOX® 1010 and IRGASTAB® UV 10, commercially available from Ciba Specialty Chemicals; GENORAD 16 and GENORAD 40 commercially available from Rahn AG, Zurich, Switzerland, and the like, as well as mixtures thereof. When present, the optional antioxidant is present in the ink in any desired or effective amount, in one embodiment at least about 0.01 percent by weight of the ink carrier, in another embodiment at least about 0.1 percent by weight of the ink carrier, and in yet another embodiment at least about 1 percent by weight of the ink carrier, and in one embodiment no more than about 20 percent by weight of the ink carrier, in another embodiment no more than about 5 percent by weight of the ink carrier, and in yet another embodiment no more than about 3 percent by weight of the ink carrier, although the amount can be outside of these ranges.

The radiation curable phase change inks can also, if desired, contain additives to take advantage of the known functionality associated with such additives. Such additives may include, for example, defoamers, slip and leveling agents, pigment dispersants, and the like, as well as mixtures thereof. The inks can also include additional monomeric or polymeric materials as desired.

Curing of the ink can be effected by exposure of the ink image to actinic radiation at any desired or effective wavelength, in one embodiment at least about 200 nanometers, and one embodiment no more than about 480 nanometers, although the wavelength can be outside of these ranges. Exposure to actinic radiation can be for any desired or effective period of time, in one embodiment for at least about 0.2 second, in another embodiment for at least about 1 second, and in yet another embodiment for at least about 5 seconds, and in one embodiment for no more than about 30 seconds, and in another embodiment for no more than about 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like.

The ink compositions generally have melt viscosities at the jetting temperature (in one embodiment no lower than about 50° C., in another embodiment no lower than about 60° C., and in yet another embodiment no lower than about 70° C., and in one embodiment no higher than about 120° C., and in another embodiment no higher than about 110° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

In one specific embodiment, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C., although the jetting temperature can be outside of these ranges. At such low jetting temperatures, the conventional use of temperature differential between the jetted ink and the recording medium upon which the ink is jetted to effect a rapid phase change in the ink (i.e., from liquid to solid) may not be effective. The gellant can thus be used to effect a rapid viscosity increase in the jetted ink upon the recording medium. In particular, jetted ink droplets can be pinned into position on a receiving recording medium such as a final recording medium, such as paper or transparency material, or an intermediate transfer member, such as a transfuse drum or belt, that is maintained at a temperature cooler than the ink jetting temperature of the ink through the action of a phase change transition in which the ink undergoes a significant viscosity change from a liquid state to a gel state (or semi-solid state).

In some embodiments, the temperature at which the ink forms the gel state is any temperature below the jetting temperature of the ink, in one embodiment any temperature that is about 5° C. or more below the jetting temperature of the ink. In one embodiment, the gel state can be formed at a temperature of at least about 25° C., and in another embodiment at a temperature of at least about 30° C., and in one embodiment of no more than about 100° C., in another embodiment of no more than about 70° C., and in yet another embodiment of no more than about 50° C., although the temperature can be outside of these ranges. A rapid and large increase in ink viscosity occurs upon cooling from the jetting temperature, at which the ink is in a liquid state, to the gel temperature, at which the ink is in the gel state. The viscosity increase is in one specific embodiment at least a $10^{2.5}$-fold increase in viscosity.

A suitable gelling agent for the ink will gel the monomers/oligomers in the ink vehicle quickly and reversibly and will demonstrate a narrow phase change transition, for example within a temperature range of from about 30° C. to about 100° C., preferably of from about 30° C. to about 70° C., although the transition range can be outside of these temperature ranges. The gel state of the ink in one specific embodiment exhibits a minimum of $10^{2.5}$ centipoise, and in another specific embodiment $10^3$ centipoise, increase in viscosity at transferring temperatures, e.g., in one specific embodiment from about 30° C. to about 70° C., compared to the viscosity at the jetting temperature. One specific embodiment is directed to gellant containing inks that rapidly increase in viscosity within from about 5° C. to about 10° C. below the jetting temperature and ultimately reach a viscosity above $10^4$ times the jetting viscosity, and in another embodiment about $10^5$ times the jetting viscosity, although the viscosity can be outside of these ranges.

When the inks are in the gel state, the viscosity of the ink is in one embodiment at least about 1,000 centipoise, in another embodiment at least about 10,000 centipoise, and in yet another embodiment at least about 100,000 centipoise, although the viscosity can be outside of these ranges. Viscosity values in the gel state are in one embodiment at least about $10^3$ centipoise, and in another embodiment at least about $10^{4.5}$ centipoise, and in one embodiment no more than about $10^9$ centipoise, and in another embodiment no more than about $10^{6.5}$ centipoise, although the gel state viscosity can be outside of these ranges. The preferred gel phase viscosity can vary with the print process. For example, the highest viscosities are preferred when jetting directly to porous paper in order to minimize the effects of ink bleed and feathering. On the other hand, less porous recording mediums such as plastic may lead to the use of lower ink viscosities that control dot gain and agglomeration of individual ink pixels. The gel viscosity can be controlled by ink formulation and recording medium temperature. An additional benefit of the gel state for radiation curable inks is that higher viscosities of about $10^3$ to about $10^4$ centipoise can reduce oxygen diffusion in the ink, which in turn can lead to a faster rate of cure in free radical initiation.

For printing applications wherein the ink is printed directly onto a final recording medium, the viscosity of the ink in one specific embodiment increases to $10^5$ centipoise or greater at the final recording medium temperature to prevent the ink from soaking into the final recording medium and/or to facilitate adhesion to the final recording medium until curing by exposure to radiation. In one specific embodiment, the temperature of the final recording medium onto which the ink is printed and at which the ink viscosity increases to about $10^5$ centipoise or greater is about 50° C. or lower.

The ink compositions can be prepared by any desired or suitable method. For example, the ink ingredients can be mixed together, followed by heating, to a temperature in one embodiment of at least about 80° C., and in one embodiment of no more than about 120° C., although the temperature can be outside of these ranges, and stirring until a homogeneous ink composition is obtained, followed by cooling the ink to ambient temperature (typically from about 20° C. to about 25° C.). The inks are gels at ambient temperature.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording medium. A direct printing process is also disclosed in, for example, U.S. Pat. No. 5,195,430, the disclosure of which is totally incorporated herein by reference. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

In a specific embodiment, the ultra-violet curable phase change gellant inks herein are employed in an ink jet printing device comprising an ink jet print head and a print region surface toward which ink is jetted from the ink jet print head, wherein a height distance between the ink jet print head and the print region surface is adjustable; wherein the ink jet print head jets an ultra-violet curable phase change ink composition as described herein.

Any suitable recording medium or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMWLL LASERPRINT® paper, and the like, glossy coated papers such as XEROX® Digital Color Gloss, Sappi Warren Papers LUSTROGLOSS®, and the like, transparency materials, fabrics, textile products, plastics, polymeric films, inorganic recording mediums such as metals and wood, and the like.

EXAMPLE

The following Example is being submitted to further define various species of the present disclosure. The Example is intended to be illustrative only and is not intended to limit the scope of the present disclosure. Also, parts and percentages are by weight unless otherwise indicated.

Example 1

An ultra-violet curable phase change gellant ink was prepared containing 7.5 percent by weight curable amide gellant as described in Example VIII of U.S. Pat. No. 7,279,587, 5 percent by weight Unilin 350™ acrylate wax prepared as described in U.S. Patent Publication 2007120925 which is totally incorporated by reference herein, 5 percent by weight pentafunctional acrylate monomer (SR 399LV dipentaerythritol pentaacrylate available from Sartomer Co., Inc.), 72.8 percent by weight difunctional acrylate monomer (propoxylated neopentyl glycol diacrylate SR 9003 available from Sartomer Co., Inc.), 3 percent by weight IRGACURE® 379 photoinitiator (obtained from Ciba Specialty Chemicals), 1 percent by weight IRGACURE® 819 photoinitiator (obtained from Ciba Specialty Chemicals), 3.5 percent by weight IRGACURE® 127 photoinitiator (obtained from Ciba Specialty Chemicals), and 2 percent by weight DAROCUR® ITX photoinitiator (obtained from Ciba Specialty Chemicals) and 0.2 percent by weight UV stabilizer (IRGASTAB® UV10, obtained from Ciba Specialty Chemicals). All of the components were stirred together at 90° C. for 1 hour.

Authentication images areas were generated digitally using a Xerox® PHASER® 860 printer firing with every third jet and deposited onto a Mylar® recording medium. After printing, the markings were cured by exposure to UV light from a UV Fusion LC-6B Benchtop Conveyor equipped with UV Fusion Light Hammer 6 Ultraviolet Lamp System employing a "D" bulb for a minimum of 1 seconds to provide robust structures. As illustrated in FIG. 1, the digitally generated UV gel dots produced with the PHASER® 860 and the instant ultra-violet curable phase change gellant ink machine provided authentication image areas of about 1.7 micrometers in height. The space between each authentication image in FIG. 1 is about 5.5 millimeters.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A method for creating an authentication image on a recording medium comprising:
   (a) depositing an ultraviolet curable phase change gellant ink composition directly onto a recording medium or depositing an ultraviolet curable phase change gellant ink composition onto an intermediate transfer member, to create both a tactilely non-perceptible image and a tactilely perceptible authentication image with the ultraviolet curable phase change gellant ink composition; and wherein the ultraviolet curable phase change gellant ink composition comprises a phase change ink vehicle comprising a radiation curable monomer or prepolymer; a photoinitiator; a reactive wax; a gellant; and an optional colorant;
   wherein the tactilely perceptible authentication image is formed by depositing successive layers of the ultraviolet curable phase change gellant ink composition directly onto the recording medium or by depositing successive layers of the ultraviolet curable phase change gellant ink composition onto the intermediate transfer member;
   (b) when an intermediate transfer member is used, transferring the deposited ultraviolet curable phase change gellant ink composition from the intermediate transfer member to the recording medium; and
   (c) curing the ultraviolet curable phase change gellant ink composition upon completion of deposition of the last of the successive layers of the tactiley perceptible authentication image upon the recording medium or after transferring the successive layers of the tactilely perceptible authentication image and the tactilely non-perceptible image from the intermediate transfer member to the recording medium.

2. The method according to claim 1, wherein the tactilely perceptible authentication image has an image height of at least 31 micrometers.

3. The method according to claim 1, wherein the tactilely perceptible authentication image is a letterhead, a personal signature, a logo, or a combination thereof.

4. The method according to claim 1, wherein depositing the ultraviolet curable phase change gellant ink composition comprises depositing with an ink jet printing apparatus.

5. The method according to claim 1, wherein depositing the ultraviolet curable phase change gellant ink composition comprises depositing with a piezoelectric ink jet printing apparatus.

6. The method according to claim 1, wherein the recording medium is selected from the group consisting of plain paper, ruled notebook paper, bond paper, silica coated paper, glossy coated paper, transparency materials, fabrics, textile products, plastics, polymeric films, metal, and wood.

7. The method according to claim 1, wherein the at least one curable monomer or prepolymer is a multifunctional acrylate or methacrylate compound.

8. The method according to claim 7, wherein the multifunctional acrylate or methacrylate compound is propoxylated neopentyl glycol diacrylate, pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxyethyl)isocyanurate triacrylate, hexanediol diacrylate, tripropylene glycol diacrylate, dipropylene glycol diacrylate, amine modified polyether acrylate, trimethylolpropane triacrylate, glycerol propoxylate triacrylate, dipentaerythritol pentaacrylate, dipentaerythritol hexaacrylate, ethoxylated pentaerythritol tetraacrylate, or mixtures or combinations thereof.

9. The method according to claim 1, wherein the photoinitiator is selected from the group consisting of benzyl ketones, monomeric hydroxyl ketones, α-amino ketones, acyl phosphine oxides, metallocenes, benzophenone, benzophenone derivatives, isopropyl thioxanthenones, arylsulphonium salts and aryl iodonium salts.

10. The method according to claim 1, wherein the reactive wax is a hydroxyl-terminated polyethylene wax functionalized with a polymerizable group.

11. The method according to claim 1, wherein the gellant is a compound of the formula

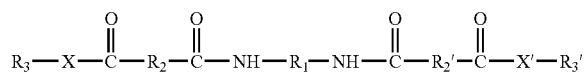

wherein $R_1$ is (i) an alkylene group, including linear and branched, saturated and unsaturated, cyclic and acyclic, and substituted and unsubstituted alkylene groups, and wherein heteroatoms either may or may not be present in the alkylene group, (ii) an arylene group, including substituted and unsubstituted arylene groups, and wherein heteroatoms either may or may not be present in the arylene group, (iii) an arylalkylene group, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) an alkylarylene group, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group; $R_2$ and $R_2'$ each, independently of the other, are (i) alkylene groups, including linear and branched, saturated and unsaturated, cyclic and acyclic, and substituted and unsubstituted alkylene groups, and wherein heteroatoms either may or may not be present in the alkylene group, (ii) arylene groups, including substituted and unsubstituted arylene groups, and wherein heteroatoms either may or may not be present in the arylene group, (iii) arylalkylene groups, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) alkylarylene groups, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group; $R_3$ and $R_3'$ each, independently of the other, are either (a) photoinitiating groups, or (b) groups which are (i) alkyl groups, including linear and branched, saturated and unsaturated, cyclic and acyclic, and substituted and unsubstituted alkyl groups, and wherein heteroatoms either may or may not be present in the alkyl group, (ii) aryl groups, including substituted and unsubstituted aryl groups, wherein heteroatoms either may or may not be present in the aryl group, (iii) arylalkyl groups, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (iv) alkylaryl groups, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group; and X and X' each, independently of the other, is an oxygen atom or a group of the formula —$NR_4$—, wherein $R_4$ is (i) a hydrogen atom, (ii) an alkyl group, including linear and branched, saturated and unsaturated, cyclic and acyclic, and substituted and unsubstituted alkyl groups, and wherein heteroatoms either may or may not be present in the alkyl group, (iii) an aryl group, including substituted and unsubstituted aryl groups, and wherein heteroatoms either may or may not be present in the aryl group, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group.

12. The method according to claim 1, wherein the gellant is a mixture of

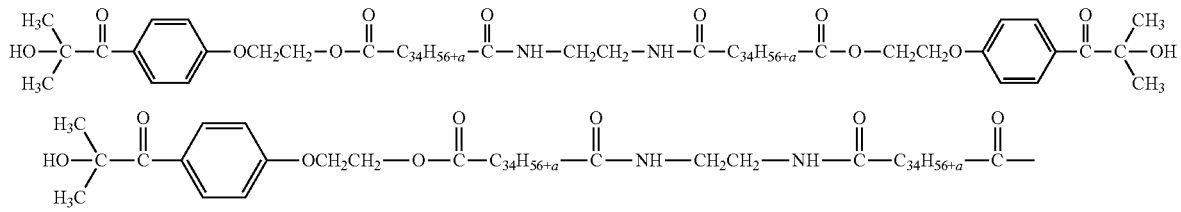

-continued
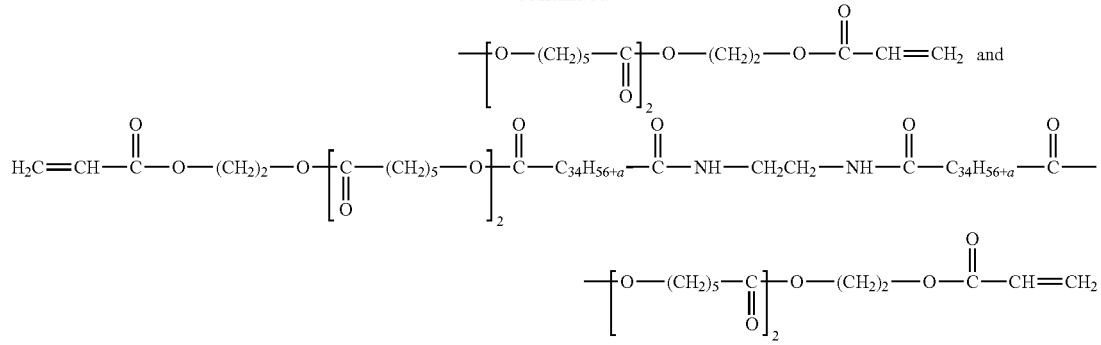
wherein —$C_{34}H_{56+a}$— represents a branched alkylene group, which may or may not include unsaturations and cyclic groups, substituted and unsubstituted alkylene groups, and wherein heteroatoms either may or may not be present in the alkylene group, wherein a is an integer of 0, 1, 2, 3, 4, 5, 6, 7, 8, 9, 10, 11, or 12.
* * * * *